3,761,351
METHOD FOR THE PRODUCTION OF A NEUTRON IMPULSE FLASH AND A NUCLEAR REACTOR FOR ITS REALIZATION

Iran Alexandrovich Gassiev, ulitsa Lenina 20, Tskhinvali, U.S.S.R.; and Gennady Iraklievich Kiknadze, prospekt V. Pshavela, 6 kvartal, 31 korpus, kv. 19; Georgy Nikolaevich Garsevanishvili, prospekt V. Pshavela, 3 kvartal, 6 korpus, kv. 7; and Vakhtang Noevich Akhobadze, ulitsa Oktyabrskaya 33, all of Tbilisi, U.S.S.R.

Filed Jan. 19, 1971, Ser. No. 107,709
Claims priority, application U.S.S.R., Jan. 28, 1970, 1395687
Int. Cl. G21c 19/02
U.S. Cl. 176—28                                   7 Claims

ABSTRACT OF THE DISCLOSURE

A method for the production of a neutron impulse flash, consisting in that nuclear fuel is placed outside a neutron moderator both before and after a neutron impulse flash and is shot through the moderator to produce such a flash. An apparatus for realizing the above-mentioned method used nuclear fuel and a neutron-moderator vessel having at least one through conduit for the nuclear fuel disposed in the conduit so that the fuel can be shot along the conduit by a suitable means, to produce a neutron impulse flash.

---

The present invention relates to methods for the production of neutron beams and to apparatus for the realization of said methods, and more specifically to methods for the production of a neutron impulse flash and to nuclear reactors to realize these methods, employed in the studies involving the use of neutrons thermalized at different energies, and also in problems whose solution calls for a maximum ratio of the neutrons in an impulse to the neutron background.

In the prior art, there is known a method for the production of a neutron impulse flash by combining nuclear fuel with a neutron moderator.

There is also known a nuclear reactor for the realization of this prior-art method, comprising nuclear fuel and a neutron-moderator vessel, in which a neutron impulse flash is produced.

In this prior-art reactor, the neutron moderator (graphite) is impregnated with nuclear fuel (uranium) and is made in the form of separate blocks which make up the active zone of the reactor, and a neutron impulse flash is accomplished by rapidly withdrawing absorbing rods from the active zone.

A major disadvantage of this reactor realizing the said prior-art method is that the neutrons and the thermal energy of nuclear fission are liberated in one and the same volume of the active zone, which results in a rapid heating of the neutron moderator, so that it is impossible to maintain a predetermined temperature of the moderator and, as a consequence, to produce thermalized neutron fields. Besides, the negative temperature coefficients encountered in the process might lead to self-quenching.

It is an object of the present invention to provide a method for the production of a neutron impulse flash, ensuring the abstraction of the thermal energy associated with nuclear fission from the active zone.

It is another object of the invention to provide a nuclear reactor which enables the temperature of the neutron moderator to be controlled at will.

In view of these and other objects, the invention (resides in) provides that in a method for the production of a neutron impulse flash by combining nuclear fuel with a neutron moderator, and according to the invention, both before and after a neutron impulse flash the nuclear fuel is held outside the neutron moderator, and the fuel is combined with the neutron moderator by shooting nuclear fuel through the neutron moderator.

So that nuclear fuel can be utilized repeatedly, it is preferable that the fuel be cooled after each neutron impulse flash.

To realize the method disclosed herein, in a nuclear reactor containing nuclear fuel and a moderator vessel, in which a neutron impulse flash is produced, the moderator vessel has, according to the invention, a through conduit for nuclear fuel, and the latter is disposed in the conduit so that it can be moved along the conduit by a suitable means.

So that the nuclear fuel can be rapidly cooled with a view to its repeated use, the nuclear reactor has a nuclear-fuel cooling means arranged relative to the neutron-moderator vessel so that nuclear fuel can re-enter the vessel only after being cooled once.

It is preferably that the through conduit should project on both sides of the neutron-moderator vessel, and the means for moving the nuclear fuel in that conduit should be made in the form of field windings setting up an electromagnetic field and located in direct proximity to and along the conduit so that the nuclear fuel is suspended, accelerated and retarded in succession.

Owing to the above-mentioned arrangement of the nuclear reactor disclosed herein for the realization of the method for the production of a neutron impulse flash, nuclear fuel is passed in the neutron moderator only at the instant when a neutron impulse flash is produced, and the thermal energy liberated by nuclear fission is abstracted from the neutron-moderator vessel, and the moderator has no time to be heated. Owing to this, it is possible to control the temperature of the neutron moderator at will, to obtain thermalized neutron fields, and to ensure high neutron fluxes in an impulse owing to the absence of the effects of a negative temperature coefficient.

These and other objects and advantages of the present invention will be more fully understood from the following description of a preferred embodiment when read in conjunction with the accompanying drawings, wherein.

Figures 1, 2:
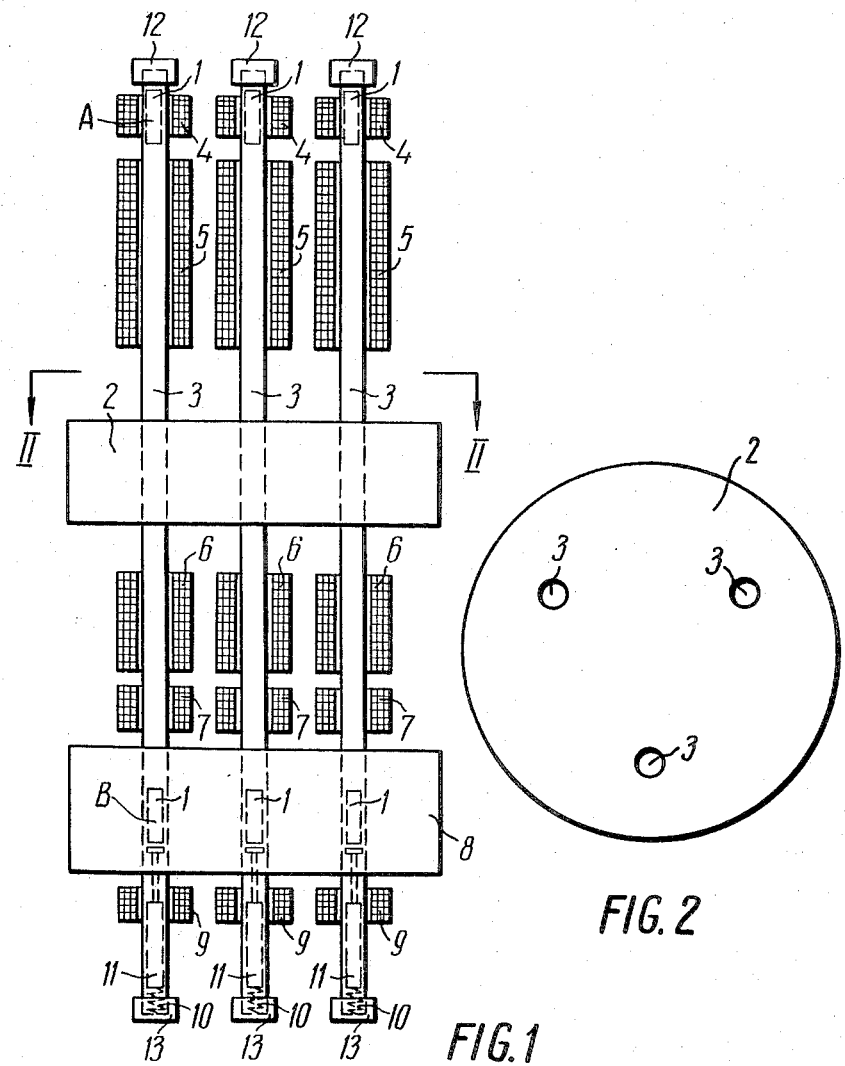
FIG. 1 is a sketch of a nuclear reactor to realize a method for the production of a neutron impulse flash according to the invention.
FIG. 2 shows a section II—II of FIG. 1.

Referring to FIG. 1, there is a nuclear reactor to realize a method for the production of a neutron impulse flash according to the invention, which reactor contains nuclear fuel in the form of a fissionable material (uranium) 1 enclosed in metal cans, a neutron-moderator vessel 2 which together with the nuclear fuel 1 forms the active zone of the reactor at the instant of a neutron impulse flash.

Before (position A) and after (position B) a neutron impulse flash, the nuclear fuel 1 is located outside the neutron-moderator vessel 2. The vessel 2 is a metal cylinder, and the moderator is liquid deuterium.

The neutron-moderator vessel 2 has three vertical through conduits 3 in the form of tubes for nuclear fuel, projecting on each side of the vessel 2 and made from a paramagnetic material, which is titanium in the case under discussion.

In each of these conduits 3, the nuclear fuel 1 is arranged so that it can be moved along each conduit by a suitable means. In the case under discussion, the means for moving the nuclear fuel 1 in the conduits 3 is made in the form of field windings 4 through 7 arranged in direct proximity to and along the conduits 3 so that the windings 4 energized with direct current suspend the fuel 1, the windings 5 energized with alternating current accelerate the fuel, and the windings 6 and 7 likewise energized with alternating current retard the fuel.

The nuclear reactor also comprises a means 8 for cooling the nuclear-fuel 1, arranged relative to the neutron-moderator vessel 2 so that the nuclear fuel 1 can enter it only after a neutron impulse flash. In the embodiment under discussion, the means 8 is a metal cylinder in which a cooling agent is made to circulate and which is located past the neutron-moderator vessel 2 in the direction of the nuclear fuel 1.

In the nuclear reactor disclosed herein, the nuclear fuel 1 is lifted from and lowered into the means 8 by A.C.-energized field windings 9 and spindles 11 loaded by a spring 10.

At the top and bottom, the conduits 3 are closed by caps 12 and 13 and are spaced apart by a distance determined by the physical parameters of the nuclear fuel and neutron moderator used. The number of conduits may vary according to these parameters. The spacing between the conduits is the same for all of them, as shown in FIG. 2.

The nuclear reactor realizing the method for the production of a neutron impulse burst disclosed herein operates as follows.

Each cycle of reactor operation during which one neutron impulse flash is produced may be divided into two stages.

The first stage consists in lifting the nuclear fuel 1 from the region of the cooling means 8 located beyond the neutron-moderator vessel 2, as far as the field windings 4 (position A, FIG. 1). This stage may arbitrarily be called an idle stroke, since no neutron impulse flash is produced. The second stage consists in moving the nuclear fuel 1 down from the field windings 4 as far as the cooling means 8. This stage may be called a power stroke.

To load the reactor, caps 13 are removed from the conduits 3 and the nuclear fuel 1, the spindles 11, and springs 10 are inserted into the conduits. After that, the caps 13 are put on the conduits 3, and the nuclear fuel 1 occupies in the cooling means 8 a position (position B, FIG. 1) outside the neutron moderator such that it will be cooled during the subsequent operation of the reactor.

To prepare the reactor for a power stroke, the field windings 9, 7 and 6 so connected and energised at that instant that travelling electromagnetic waves are produced in them, moving from bottom upwards. The conduits are put in operation one after another, with a certain delay, rather than all at a time, this is done in order that the nuclear fuel 1 located in the various conduits 3 does not find its way into the neutron-moderator vessel 2 simultaneously, as this might give rise to a chain reaction.

The field set up by the field windings 9 lifts the spindles 11 and unclear fuel 1 to a position in which the nuclear fuel 1 is within the zone affected by the field winding 7. At the same time, the windings 9 are de-energized, and the travelling electromagnetic field due to the winding 7 catches the nuclear fuel 1 and, acting together with the fuels due to the field winding 6, causes it to move up the conduit 3 with a speed such that as the nuclear fuel 1 keeps on moving upwards and approaches the zone affected by the winding 4, gravity brings its speed to practically zero.

The windings 4 are turned on just as the nuclear fuel 1 leaves the zone affected by the winding 6. The force developed by the winding 4 is such that the nuclear fuel 1 is retarded and remains suspended (position A, FIG. 1). At the same time the field windings 6 and 7 are de-energized.

When the nuclear fuel 1 is suspended in all the conduits 3, the idle stroke is completed, and the reactor is ready for a power stroke (position A, FIG. 1). In this position, all the three pieces of nuclear fuel 1 are outside the region of the neutron-moderator vessel 2.

To start the reactor on a power stroke, the field windings 4 are de-energized, and the field windings 5 are energized. The nuclear fuel 1 is caught by the travelling electromagnetic field due to the windings 5 and is accelerated to a pre-determined speed.

After the nuclear fuel 1 has moved out of the zone controlled by the windings 5, the latter are de-energized, and the entire mass of fuel 1 is shot through the neutron-moderator vessel 2, thereby causing the fissionable material in fuel 1 to go critical with the result that a neutron impulse flash with a duration of about $10^{-2}$ second is produced in it. The magnitude and duration of the resultant neutron flux are registered by suitable instruments (not shown in the drawing).

Once it has left the active zone, the entire mass of nuclear fuel 1 finds itself in the zones controlled by the field windings 6 and 7 whose field retards the nuclear fuel 1 to a speed close to zero.

The windings 9 are energized simultaneously with the windings 6 and 7. As a result, the spindles 11 are lifted to a position such that the nuclear fuel 1 is placed on their top parts. After that the windings 6, 7 and 9 are de-energized, the spindles 11 are lowered onto the springs 10, and the nuclear fuel 1 occupies in the cooling means 8 a position in which it will be cooled.

After the nuclear fuel 1 has been cooled to a predetermined temperature, the reactor is ready for the next cycle, that is, for the production of a next neutron impulse flash.

The nuclear reactor disclosed herein for the realization of a method for the production of a neutron impulse flash according to the invention makes it possible to use moderators with temperatures varying over a very wide range from that of helium to very elevated temperatures. Besides, this reactor is free from practically any neutron background. These features may be advantageously utilized in studies involving neutrons thermalized at different energies, and also problems whose solution calls for a maximum ratio of neutrons in a pulse to neutron background.

What is claimed is:

1. An apparatus to produce a neutron-impulse flash by causing a high velocity movement of a fissionable material through a neutron-moderator, comprising: a stationary vessel containing a neutron moderator material; at least one heat conductive elongated conduit passing into and through said neutron moderator material to extend on two sides of said stationary vessel, said conduit having a start region and a finish region; nuclear fuel in the form of a fissionable material enclosed in a container and disposed in said elongated conduit for translatory movement between said start and finish region of the conduit; means for causing a reversible controlled traveling movement of said nuclear fuel in said conduit along the length thereof, substantially between said start and finish regions so as to shoot said nuclear fuel contained in the container through the neutron moderator material at a predetermined velocity thereby causing said nuclear fuel to go critical and generate a neutron impulse flash, whereby, after each translatory movement of said nuclear fuel for neutron-flash generation, the nuclear fuel is outside of the moderator material which material is consequently not directly subjected to fission-heat.

2. An apparatus as claimed in claim 1, wherein said means for causing a reversible traveling movement includes electrical field winding means for causing a traveling electromagnetic field along the length of the conduit, said field winding means including a first alternating current winding to accelerate said nuclear fuel into a region of the neutron moderator material, and a second alternating current winding to retard and decelerate the nuclear fuel after said container having the nuclear fuel has been shot through said neutron moderator material.

3. An apparatus as claimed in claim 2, wherein said at least one heat-conductive elongated conduit is substantially vertical, and wherein said means for causing a reversible traveling movement includes a direct-current winding means disposed at the top end of the vertical conduit for holding said nuclear fuel at the top of the conduit when said direct current winding means is energized.

4. An apparatus as claimed in claim 3, which further includes cooling means disposed around said conduit in a region away from said stationary vessel for cooling said nuclear fuel after production of each neutron impulse flash.

5. A method for the production of the neutron impulse flash by shooting nuclear fuel through a neutron moderator so as to cause the nuclear fuel to go critical, comprising: arranging at least one through-conduit in a neutron moderator material contained in a stationary vessel, said through-conduit being made to extend on both sides of said vessel; placing nuclear fuel within and at a first end of said conduit and holding the nuclear fuel in a sub-critical state away from and outside said neutron moderator material in said vessel; shooting the nuclear fuel through the neutron moderator material along said conduit at a pre-determined velocity and making said nuclear fuel go critical to produce a neutron impulse flash, thereby making the shot nuclear fuel reach a second end remote from said first end of the conduit, which second end is also outside the neutron moderator material.

6. A method as claimed in claim 5, which includes a step of cooling said nuclear fuel after said nuclear fuel has been shot through said neutron moderator material, said cooling being performed in a region away from and outside of said neutron moderator vessel.

7. A method as claimed in claim 5, which includes the step of moving said nuclear fuel from said second end to said first end of the conduit in an idle stroke so as to hold said nuclear fuel in said sub-critical state at said first end, and wherein said step of shooting the nuclear fuel through the neutron moderator along the conduit constitutes a power stroke to produce a neutron impulse flash.

References Cited

UNITED STATES PATENTS

| 3,070,697 | 12/1962 | Muench | 176—17 |
| 3,140,411 | 7/1964 | Oickle et al. | 310—11 |
| 2,860,093 | 11/1958 | Wigner et al. | 204—154.2 |
| 3,464,888 | 9/1969 | Boettcher | 176—18 |

FOREIGN PATENTS

| 1,126,037 | 3/1962 | Germany | 176—Dig. 1 |
| 1,084,717 | 9/1967 | Great Britain | 176—Dig. 1 |

OTHER REFERENCES

Preliminary Hazards Summary Report for the Ordance Pulsed Experimental Research Assembly, April 1960, AN 174, Aerojet-General Corp., pp. III–19 and III–20.

CARL D. QUARFORTH, Primary Examiner

H. E. BEHREND, Assistant Examiner

U.S. Cl. X.R.

176—Dig. 001